United States Patent [19]

Kuhn et al.

[11] Patent Number: 5,639,525
[45] Date of Patent: Jun. 17, 1997

[54] POLYMER COMPOUND FOR THE PRODUCTION OF SEALING ELEMENTS FOR VESSEL OR CONTAINER CLOSURES

[75] Inventors: Tino Kuhn, Bremen; Georg Schlenk, Stuhr, both of Germany

[73] Assignee: DS-Chemie GmbH, Bremen, Germany

[21] Appl. No.: 849,183

[22] Filed: Mar. 11, 1992

[30] Foreign Application Priority Data

Mar. 15, 1991 [EP] European Pat. Off. ............. 91104029

[51] Int. Cl.$^6$ ........................................... C08K 5/01
[52] U.S. Cl. ...................... 428/35.5; 525/72; 525/240; 525/56; 525/58; 525/60; 525/123; 428/35.1; 428/35.2; 428/35.3; 428/35.4; 428/35.6; 428/158
[58] Field of Search .................... 525/56, 58, 60, 525/123, 72, 240; 428/35.1–35.6, 158

[56] References Cited

U.S. PATENT DOCUMENTS

| | | | |
|---|---|---|---|
| 4,232,132 | 11/1980 | Grico et al. | 525/222 |
| 4,309,332 | 1/1982 | Fischer et al. | 525/229 |
| 4,801,418 | 1/1989 | Bersano | 525/88 |
| 4,911,985 | 3/1990 | Jenkins et al. | 428/446 |
| 4,925,715 | 5/1990 | Sato | 428/40 |
| 4,997,880 | 3/1991 | Van Der Groep | 525/222 |
| 5,045,594 | 9/1991 | Samuel et al. | 525/57 |
| 5,075,362 | 12/1991 | Hofeldt et al. | 524/72 |
| 5,086,121 | 2/1992 | Hazelton et al. | 525/222 |
| 5,104,710 | 4/1992 | Knight | 525/222 |
| 5,211,974 | 5/1993 | White | 426/106 |

FOREIGN PATENT DOCUMENTS

| | | |
|---|---|---|
| 439947 | 8/1972 | Australia . |
| 0092318 | 10/1983 | European Pat. Off. . |
| 0116783 | 8/1984 | European Pat. Off. . |
| 0129310 | 12/1984 | European Pat. Off. . |
| 0174032 | 3/1986 | European Pat. Off. . |
| 0370272 | 5/1990 | European Pat. Off. . |
| 0488491A1 | 6/1992 | European Pat. Off. . |
| 1145241 | 10/1957 | France . |
| 1877377 | 6/1963 | Germany . |
| 1212726 | 3/1966 | Germany . |
| 1544989 | 2/1972 | Germany . |
| 1782737 | 3/1972 | Germany . |
| 1532416 | 7/1972 | Germany . |
| 2303698 | 8/1974 | Germany . |
| 2902859 | 8/1979 | Germany . |
| 2934021 | 3/1980 | Germany . |
| 3307904 | 9/1983 | Germany . |
| 3519053 | 12/1986 | Germany . |
| 3615241 | 11/1987 | Germany . |
| 3620690 | 12/1987 | Germany . |
| 2164744 | 7/1987 | Japan ................................. 525/229 |
| 1112025 | 5/1968 | United Kingdom .................. 525/222 |

OTHER PUBLICATIONS

Abstract searched from Derwent–Abstracts, No. 66299A/37. 1966.
Abstract searched from Derwent–Abstrcts, No. 76668 D/42. 1976.
Abstract searched from Derwent–Abstrcts, No. 84–034305/06. 1984.
Abstract searched from Derwent–Abstrcts, No. 05135B/03. 1984.
Abstract searched from Derwent–Abstracts, No. 88–017840/03. 1988.
Abstract searched from Derwent–Abstracts, No. 68–01141Q/03. 1968.
Chemical Abstract, vol. 95, 1981, Ref. 204838a. 1981.
Abstract searched from "Hochmolekularbericht 1983", No. 975/1983. 1983.
STN Caplus Abstract #1988:76350.
STN Caplus Abstract #1989:516204.
STN Caplus Abstract #1990:613692.
STN Caplus Abstract #1991:187327.
STN Caplus Abstract #1992:635261.
Hawley's Condensed Chemical Dictionary, (1987), p. 935 Defining "Polyethylene".

*Primary Examiner*—Cecilia J. Tsang
*Assistant Examiner*—Patrick R. Delaney
*Attorney, Agent, or Firm*—Merchant, Gould, Smith, Edell, Welter & Schmidt, P.A.

[57] ABSTRACT

The invention relates to a polymer compound for the production of sealing elements for vessel or container closures, which sealing elements when closed have a barrier effect preventing the penetration of gaseous or vaporous substances such as oxygen or aromatic compounds, in particular benzenes, phenyl ethers and suchlike into the vessel and/or show an excess pressure valve effect at interior vessel pressures of between approx. 3 and 10 bar and may be produced by mechanical forming of the unshaped thermally plastified polymer compound and its subsequent hardening directly on or in the vessel closure ("in shell" moulding), comprising a mixture of butyl and/or acrylate rubber and a polymer of an α-olefinic unsaturated monomer as well as, if appropriate, one or several further polymer components and common additives such as glide enhancers, pigment, talcum and stabilizers. The invention further relates to a sealing element of this kind and a corresponding vessel or container closure.

11 Claims, 4 Drawing Sheets

POLYMER COMPOUND FOR THE PRODUCTION OF SEALING ELEMENTS FOR VESSEL OR CONTAINER CLOSURES

DESCRIPTION

The invention relates to a polymer compound for the production of sealing elements for vessel or container closures.

The invention further relates to vessel or container closures comprising such a sealing element, more specifically a twist crown cork or screw cap, for bottles, jars and the like as well as a sealing element for vessel or container closures, more specifically bottle and jar closures made of metal or plastics.

Vessel closures must be suitable for being fitted on the vessel simply and nevertheless with a reliable seal, while usually no secondary treatments should be necessary and the dimensions of the vessel opening and its state of conservation and roughness (for example in the case of returnable bottles) may vary a great deal. It has therefore already been known for a long time to provide vessel closures, for example crown corks, with an elastic sealing element on their inside facing the vessel, which sealing element is pressed between the closure and the vessel when the closure is fitted and ensures tightness.

While formerly the inserts of crown corks or bottle screw closures were predominantly made of press cork which wag, if appropriate, also coated with a thin plastics film or thin aluminium foil, sealing elements have for some time been produced completely from synthetic polymer compound. However, only polymer compounds which are durable and resistant enough and at the same time have the necessary elasticity are suitable for this.

In practice, PVC is still mainly used in such compounds; however, polyethylene and mixtures of these substances with vinylacetate or vinylacetate-ethylene copolymers have already been used.

The production of vessel closures with the use of such polymer compounds is described for example in German Auslegeschrift 2,033,064 and German Offenlegungsschrift 3,021,488. However, these known polymer compounds still have considerable disadvantages. The use of PVC or other halogen-containing plastics leads to ever increasing difficulties in the disposal and neutralization of the used vessel closures finding their way into household refuse. In the usual incineration treatment of household refuse, halogen-containing plastics produce acidic gases, the release of which into the atmosphere is harmful. The addition of low molecular weight plasticizers (for example phthalates), indispensable for adjustment of the required sealing properties, is not harmless either, for reasons of health care, since these plasticizers are partially released again from the PVC and can find their way into the human body via food-stuffs or beverages contained in the vessel. For this reason, the proportion of plasticizers in such polymer materials is set upper limits by corresponding regulations.

In many cases, polyethylene alone is unsuitable as a sealing material, in particular if temperature fluctuations or damaged vessel mouths have to be taken into account. For reasons of tightness, known polyethylene sealings are, in addition, not suitable for carbonated beverages.

Turning more specifically to vessel or container closures, such as crown corks screw caps and screw lids, which are usually made of metal or plastics such as polyolefine material, the sealing element most often taking the form of a liner adhered to the inside of the closure, the following requirements are generally placed on such closures:

Good sealing properties, especially on poor or returnable containers. The liner must form into the damaged surface ensuring a gas or liquid tight seal.

In the case of screw-on closures, the closure must exhibit low closing and opening torques to facilitate trouble-free closing in the bottling plant and easy opening at the end user.

The product must have no flavour of its own which it can impart to the contents of the container.

The liner material must exhibit good adhesion to the cap material, especially to polyolefine materials, as in polypropylene or polyethylene bottle caps, to ensure good retention of gases such as carbon dioxide and closure integrity.

The sealant must be placed correctly into the closure so that it is in full contact with the mouth of the bottle. It must also ensure that the integrity of the seal is guaranteed in the case of "cocked" closures.

The liner must meet the demands of the Food and Drug Administration relating to products in direct contact with foodstuffs or food products. In some countries such sealants may not contain PVC or ester based plasticizers due to health or disposal problems particularly when the products are incinerated.

The liner must be formable during production so that different profiles can be made to suit the different shapes and sizes of the bottle or jar opening. Equally, the product must show good "plastic memory" for reclosing the bottle.

The closure and the liner must withstand post-treatments, such as pasteurisation, hot-filling, cooling, transport, etc.

The liner must contain no surfactants (which alter for instance the foam stability of beer).

The total closure must be produced economically and at maximum production speeds, presently e.g. approx. up to 2,500 caps per minute.

Today, closures of this kind must meet two additional demands:

The closures should have a valve effect in case of any excess pressures arising in the vessel or container, in particular beer, lemonade or mineral water bottles;

When fitted, the closures should prevent any substances which would affect aroma, in particular also taste, from entering the vessel or container.

Excess pressures in the vessel or container can result from over-heating and may lead to the vessel or container bursting. This not only results in the loss of the vessel contents, but also presents a quite considerable danger of injury, in particular by glass splinters flying about. The valve effect of the closures is to ensure that the excess pressure (mostly $C_2O$) can be released in time and thus eliminated.

Any changes of the taste of the vessel contents, in particular after long storage times, are mainly due to two influences, i.e. oxidative aroma changes after the entry of oxygen on the one hand, and changes of taste after the entry of other, in particular aromatic, substances such as benzenes or also phenyl ethers, for instance chloranisols. The latter are contained in objects comprising wood, such as pallets, cardboard boxes and the like and accumulate in packaging like welded foils, shrinking foils and suchlike. These substances are suspected of being able to penetrate through conventional polymer compound sealings and into the interior of vessels or containers. Even if present only in the ppm range, they already cause considerable changes of taste.

In order to avoid the entry of oxygen, sealing elements have already been proposed which contain oxygen-bonding substances (oxygen receptors). These substances are to bond the entering oxygen in the sealing element so that it does not reach the vessel contents. However, oxygen receptors have so far not been admissible for products in direct contact with foodstuffs and themselves often do not have perfect sensory properties.

German Patent DE-OS 15 44 989 discloses sealing liners for vessel or container closures which can comprise a variety of compounds. Amongst others, butyl rubber/polyethylene mixtures are also described which can additionally contain EVA copolymer. The composition ranges are broad; for polyethylene/butyl rubber/EVA mixtures, a composition at a ratio of 2:2:1 is preferred. This prior art uses low-density polyethylene (LDPE) so as to ensure a particularly high-grade sealing and pressure holding characteristic over long periods of time at elevated temperature. Sealing elements made from these compounds are not suited for an excess pressure safety valve function. On the other hand, LDPE compounds cannot be processed smoothly on modern machines, in particular not with the "in-shell" moulding technique, since they smear and lump when granulated and stick to the blade after extrusion.

German patent DE 29 34 021 discloses a container closure including a separable liner, said liner being fixed to the closure capsule by means of an adhesive layer. This prior art discloses a variety of extrusion mouldable thermoplastic resins, amongst others also low-density polyethylene (LDPE).

German patent application DE-OS 17 82 737 describes sealing elements for container closures made of a thermoplastic material, amongst others of a mixture of LDPE, butyl rubber and EVA polymers. Also in this case LDPE ensures high-grade sealing and pressure holding characteristic, with no safety valve function being provided.

A preformed sealing liner for container closures is disclosed in German patent application DE-OS 15 32 416. Adherence of this liner to the closure is obtained by including solid oxidized polyethylene or ethylene copolymer with some other olefine or vinyl monomer in the material of the liner or by providing same as a layer between the liner and the closure.

German utility model DE-GM 18 77 377 relates to a crown cap with sealing ring which is to effect absolute sealing. The sealing ring is fixed to the closure cap by means of a paint coating of epoxy phenol resins.

A screw cap disclosed in German patent application DE-OS-33 07 904 includes a sealant, which is provided at the Junction of a lid and a protrusion, which sealant forms a gas-tight bottle closure.

German patent application DE-OS-35 19 053 describes sealings for container closures which comprise a polymer mixture of LDPE or LLDPE as well as a styrene isoprene styrene (SIS) block copolymer. The mixture further contains an additional amount of inorganic filler and cork powder.

German specification DE-AS 12 12 726, U.S. Pat. No. 4,911,985, U.S. Pat. No. 4,925,715 and European patent 0 116 783 disclose polymer mixtures containing high-density polyethylene which mixtures are used in different applications.

It is thus an essential object of the invention to specify polymer compounds for the production of sealing elements for vessel closures, corresponding vessel closures fitted with such sealing elements as well as such sealing elements which—when closed—provide for a barrier effect preventing gaseous or vaporous substances such as oxygen and other flavour-impairing substances from entering the vessel.

A further essential object of the invention is to provide polymer compounds for the production of sealing elements for vessel closures, vessel closures fitted with such sealing elements and corresponding sealing elements having an excess pressure valve effect at interior vessel pressures of between approx. 3 and 10 bar.

It is in particular an essential object of the invention to specify corresponding polymer compounds, vessel closures and sealing elements which have both the said barrier function and the said excess pressure valve effect.

It is yet another object of the invention to provide polymer compounds for the production of Laid vessel closures and sealing elements, which are suitably fitted directly on or in the vessel closure by means of in-shell moulding, i.e. mechanical forming of the unshaped, thermally plastified polymer compound and its subsequent solidification to the desired hardness to give the finished elastic sealing element.

In this respect, it is a further object of the invention to also meet the above-mentioned essential and general requirements placed on sealing elements for vessel closures.

These objects are attained by the features disclosed in the independent claims.

Advantageous embodiments are defined in the subclaims.

The polymer compound according to the invention may be produced from easily obtainable raw materials. It can be processed by means of the machines already available for the processing of comparable PVC materials, e.g. produced by the SACMI Company, Italy. To improve the cutting and transporting behaviour of the polymer compound, a small content of highly disperse silicic acid or amide wax may advantageously be provided. The plastified polymer compound can be extruded, cut and subsequently compression-set without difficulties. It then hardens into the desired moulding.

This moulding, produced from the polymer compound and either adhering to the vessel closure or inserted in it has, with good dimensional stability, an elasticity which is adequate to ensure tightness for all usual applications of vessel closures. The vessels can undergo pasteurization with fitted closure, without the sealing moulding suffering or leaking.

The sealing elements according to the invention provide for an excess pressure function between approx. 3 and 10 bar in that when a certain interior pressure in the vessel is exceeded, they give in elastically, thus enabling the material causing the excess pressure (mostly carbon dioxide) to exit. As soon as the interior pressure has decreased to the given value again, at which the valve effect is obtained, the sealing element forces the vessel closure back to the vessel so that it is completely gastight. Bursting of the vessel due to unpredictable and undesired excess pressures in the vessel can thus be avoided. The interior pressure at which the excess pressure valve function occurs can be adjusted by the mixture of the compound and, if necessary, additives influencing its mechanical properties.

At the same time the sealing elements according to the invention have a pronounced barrier effect against the penetration of oxygen, benzenes and chloranisols in the vessel. This barrier effect lasts undiminishedly for very long periods of time, thus preventing for example in the case of beer bottles packaged in cardboards or pallets and sealed in welded foils or shrinking foils, that the flavour of the beer is changed by the penetration of such substances.

Since the polymer compound does not contain any low molecular weight plasticizers, it is harmless from the point of view of foodstuffs regulations; if it finds its way into household refuse, it cannot release any harmful acid gases in a refuse incineration plant, since it is halogen-free. Vessel closures according to the invention comply with regulations, such as are specified for example in German standard DIN 6099 for crown corks.

It goes without saying that the polymer compound according to the invention can be adapted to the particular requirements of various applications by its composition being appropriately chosen. For instance, its elasticity can be influenced by means of the total proportion of additives which modify the initial hardness of the components used.

The use of the polymer compound according to the invention has the further advantage that the mouldings produced can be lighter than known sealing elements, for example of PVC. With the polymer compound according to the invention, for example, inner inserts for crown corks weighing only approximately 150 to 160 mg can therefore be produced; this is a not inconsiderable material saving in comparison with prior art inner inserts of PVC.

It should be understood that the invention is fully applicable to usual liner dimensions, e.g. liner weights between approx. 150 and 250 mg for crown corks; between 220 and 320 mg for aluminum screw caps; between 250 and 400 mg for plastic screw caps, and even higher weights for larger closures, as jar screw lids etc.

It is necessary in particular for mechanically sealing bottle and vessel closures of metal or plastic, such as crown corks and screw caps, that the sealing element forming the insert adheres to the closure firmly and over its full area. Otherwise, if vessel mouths are damaged, displacement or twisting of the insert may occur, and consequently so may leakages. In addition, if there is poor adhesion of the insert, local detachments cause moisture-filled bubbles which promote the corrosion of metal closures. There disadvantageous effects are effectively suppressed particularly by the PE content of the compound.

The use of the invention's compounds has the advantage that any content of aromatic polymers in the compound is avoided completely. Styrene derivatives, which are occasionally contained in similar compounds, can disadvantageously influence odour and taste of the packaged product.

The absence of aromatic polymers increases the processing reliability, in particular at relatively high temperatures, by suppressing the occurrence of undesired monomers or degradation products.

The production of the closure with liner or sealant usually uses the so-called "in-shell" moulding technique at used by industrial HC machines. The granules of the compound are fed into an extruder which melts and pumps the molten product to an orifice. External of this orifice is a rotating blade which cuts the extrudate into a pellet and flips it into the closure. Here two important characteristics of the new sealant are perceived, namely no adhesion to the blade and good flip properties. If the flip properties are not good, then the pellet does not land centrally in the cloture causing voids or flashing on forming. The raw materials used in the invention ensure theme important factors.

After the pellet has been placed centrally in the closure, a die punch with a chosen profile presses down on the still molten pellet. This process spreads the sealant into the closure and simultaneously gives it the required profile. This formability is also a special characteristic of the new sealant formulation for the following reasons: The product needs not only to form well but on cooling retain its dimensional stability without shrinkage or change. The new composition of the invention ensures these essential requirements.

Another important feature of the new sealant is that the "in shell" moulding machines can now run trouble-free at maximum speed with minimum rejects. This property is conferred by the polymer blend enabling running speeds to be raised to an output of up to 2,500 caps/min.

At the bottling plant the closures must be screwed onto the bottle or the jar with torque values below 0.22 kpm inch/lbs.), preferably under 0.17 kpm (15 inch/lbs.). Having closed the bottle, which may have been hot or cold, filled or even pasteurized, the sealant must retain its shape and form. Most bottles are cooled to approx. 4° C. in fridges before consumption; also here no shrinkage may take place. It goes without saying that transport or storage in hot climates may not cause undue expansion or creep which would result in a loss of carbon dioxide.

Flavour may not be imparted to the contents of the bottles, not even by the compound. Avoiding this is another important advantage of the invention.

The invention is further elucidated below with reference to exemplary embodiments, which concern an inner liner for a bottle crown cork made of metal. All weight-% statements are based on total compound weight, unless otherwise stated.

EMBODIMENT EXAMPLE 1

A polymer compound is prepared by mixing about 33 weight-% of butyl rubber (commercially available under the name "Polysar EER 101/3" from Polysar) with about 33 weight-% of HDPE ("Eraclene HVSG 5215 P" from Enichem) and about 30 weight-% of EVA-copolymer ("Evatane 2805" from ATO). The EVA-copolymer has a relative VA content of about 10%. A mixture of LDPE ("Lupolen 1800 S" from BASF AG) and PP of about the same Shore hardness may be used instead of the HDPE.

As well as these constituents, minor amounts of less than 1% by weight each of highly dispersed $SiO_2$ or silicon oil, pigments, stabilizers and erucic acid amide as well as 3.5 % of talcum are added to the polymer compound. The silicon content helps to prevent adhesion of the cut pellet or lump of compound to the blade.

The polymer compound produced in this way is fed to an HC machine. In this machine, the polymer compound first passes into an extruder, in which it is melted. It leaves the outlet orifice of the extruder as a plastic extrudate, which is cut into individual lumps by a blade directly after the orifice.

Each of these lumps, which each weigh approximately 160 to 180 mg, is individually flipped onto the inner surface of screw closure cap made of polypropylene (PP). The still plastic polymer compound is spread over this inner surface by a die punch and stamped to form a thin, approximately disc-like moulding. At the same time, it is possible to form any annular projections of the moulding which may be desired, which embrace the bottle rim in the mouth region when the cap is fitted.

After cooling and hardening of the thermoplastic polymer compound, the moulding forming the inner liner of the screw cap is no longer plastically deformable in normal conditions of use, but can bear elastically with sealing effect against the bottle rim when the cap is screwed onto the bottle. Owing to its elasticity, the moulding can thereby compensate for unevennesses (for example due to damage) and also for the roughness of the bottle rim caused by production tolerances.

EMBODIMENT EXAMPLE 2

A polymer compound is prepared by mixing about 48 weight-% of butyl rubber with about 48 weight-% of HDPE.

In this case too, a mixture of LDPE with PP, having about the same Shore hardness, can be used instead of the HDPE.

Less than 1% by weight each of highly dispersed $SiO_2$ or silicon oil, pigments, stabilizers and erucic acid amide as well as 3.5% of talcum are added to the polymer compound.

The polymer compound produced in this way is fed to an HC machine, where it first passes into an extruder, in which it is melted. It leaves the outlet orifice of the extruder as a plastic extrudate, which is cut into individual lumps by a blade directly after the die orifice.

Each of these lumps, which each weight approximately 220 to 240 mg, is individually flipped onto the inner surface of an aluminum capsule, which forms the body of a screw cap. The still plastic polymer compound is spread over this inner surface by a die punch and stamped to form a thin, approximately disc-like moulding. At the same time, it is possible to form any annular projections of the moulding which may be desired, which embrace the bottle rim in the mouth region when the cap is fitted.

After cooling and hardening of the thermoplastic polymer compound, the moulding forming the inner liner of the screw cap is no longer plastically deformable in normal conditions of use, but can bear elastically with sealing effect against the bottle rim when the cap is screwed onto the bottle. Owing to its elasticity, the moulding can thereby compensate for unevennesses (for example due to damage) and also for the roughness of the bottle rim caused by production tolerances.

EMBODIMENT EXAMPLES 3 and 4

Embodiment example 2 is repeated, adding 5% and 20% at a time of polyamide ("Vestamid", available from Hüls AG).

EMBODIMENT EXAMPLE 5

Embodiment example 2 is repeated, adding 40 wt-% of polyurethane (admitted by the FDA).

EMBODIMENT EXAMPLE 6

A polymer compound is produced by mixing about 40 wt-% of butyl rubber ("Polysar EER 101/3") with about 55% of EVA copolymer (10% VA content, available from ATO under the trade name "EVATANE 2805").

Furthermore, 49% of talcum, and 0.1% of erucic acid amide are added as a glide enhancer.

EMBODIMENT EXAMPLE 7

Embodiment example 6 is repeated, adding 40 wt-% of polyurethane (admitted by the FDA).

EMBODIMENT EXAMPLE 8 and 9

Embodiment example 6 is repeated, adding 5 wt-% and 20 wt-% at a the of polyamide ("Vestamid" from Hül s AG).

EMBODIMENT EXAMPLES 10 through 18

The embodiment examples 1 through 9 are repeated, partly or fully replacing the butyl rubber by a commercial acrylate rubber of comparable characteristics.

The vessel closures produced according to the above embodiment examples 1 through 18 have both a pronounced barrier effect and valve properties.

Even after time spans of several months no penetration of oxygen, benzene or chloranisol into the interior of the vessel has been observed. If the interior pressure in the vessel is increased, then the vessel closures according to the invention allow the excess pressure to exit before the latter can increase to dangerous values.

FIG. 1 shows the oxygen penetration as a function of time. A comparison of the test results shows that the barrier effect against oxygen exerted by sealing elements in accordance with the invention (CS 20, CS 25) is far superior than that of a standard prior art PVC sealing element in which an almost exponential increase in penetration of oxygen with time is observed.

FIG. 2 shows the trichloranisol influx into 100ml glass bottles as a function of time for a standard PVC sealing (on the left side) and a sealing according to the invention (Oxylon CS 25) (on the right side).

The barrier function of the invention's sealing elements against trichloranisol is considerably better than that of standard PVC sealing elements.

Figure 1:
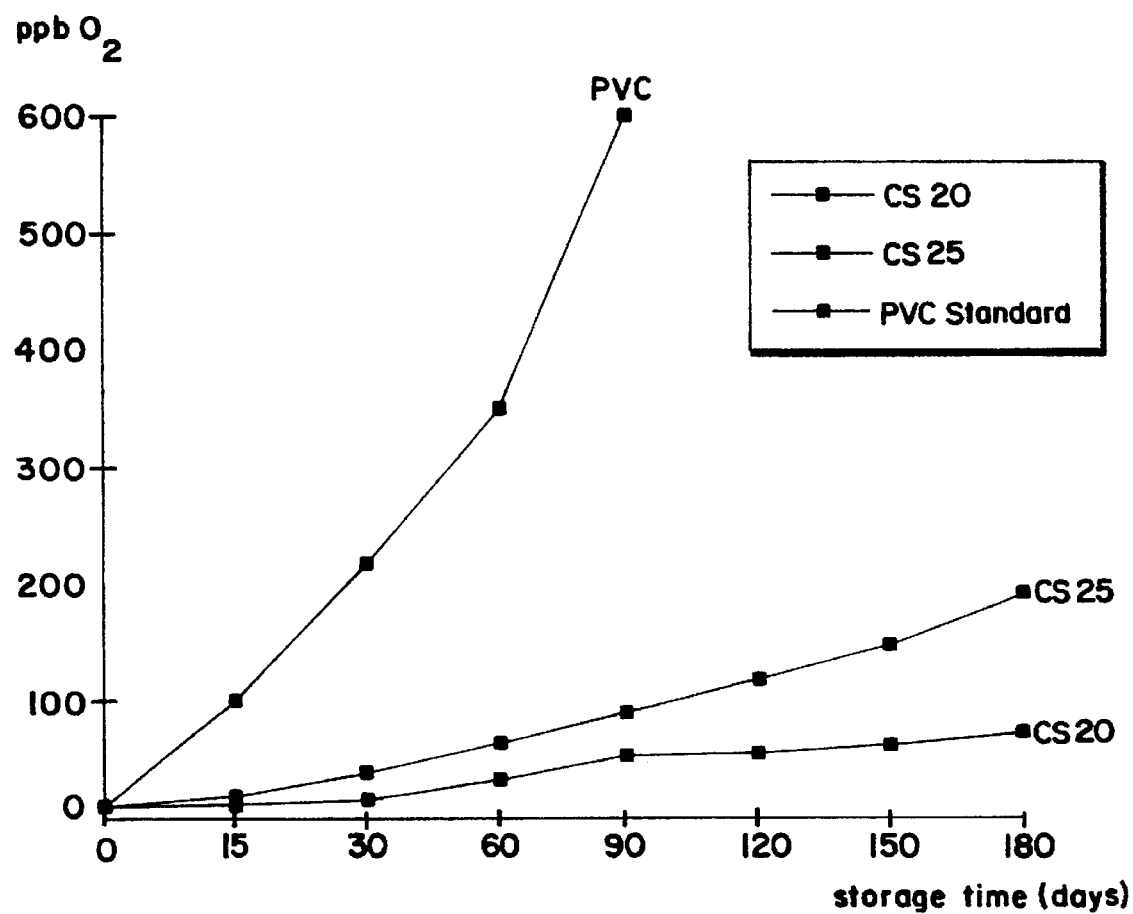
FIGS. 1 through 4 show the results of tests in which the barrier effect against trichloranisol and oxygen as well as the valve properties (according to the standard delivery terms of European breweries) were measured.
Figure 2:
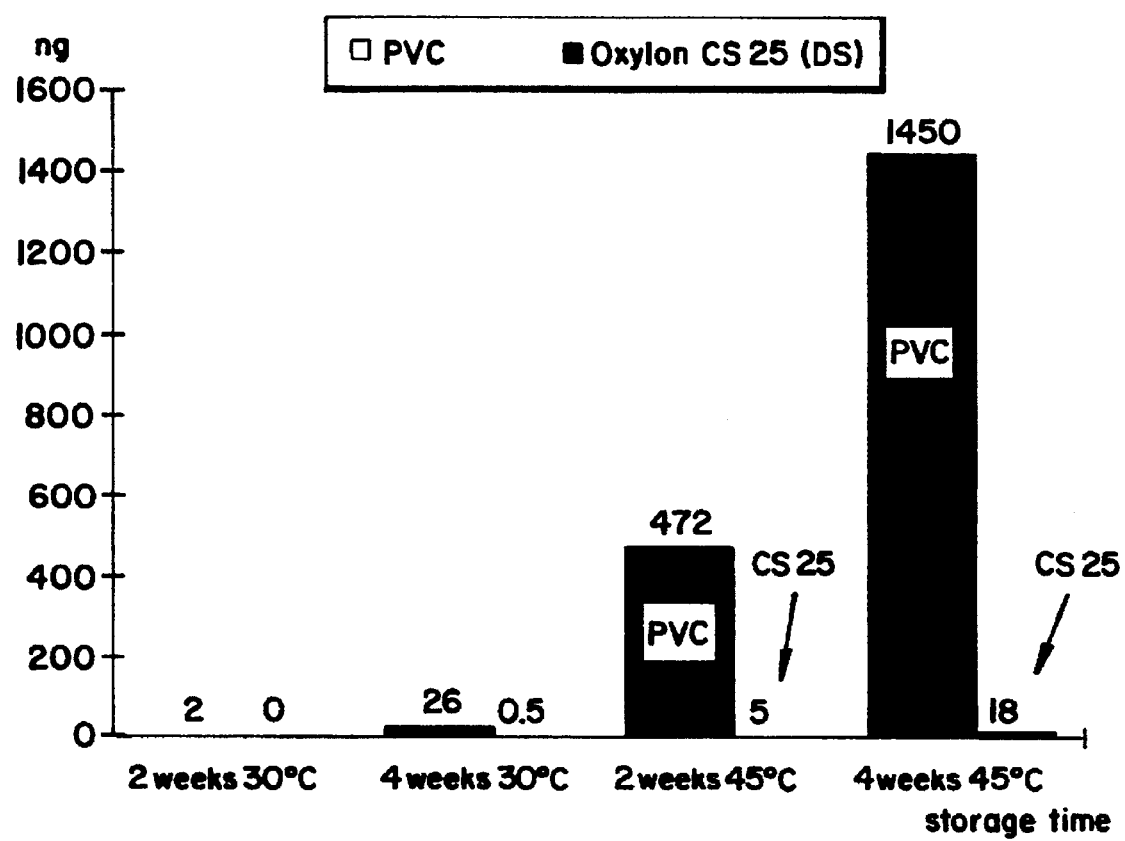
Figure 3:
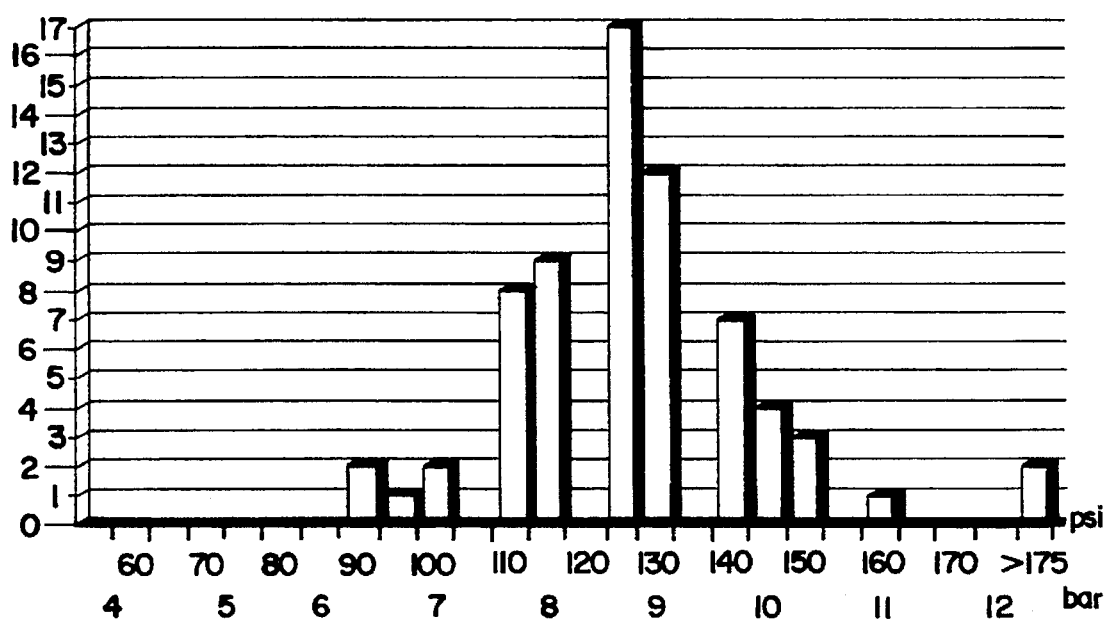

FIG. 3 shows the dependence of pressure tightness on increasing interior pressure, measured in 68 returnable glass bottles 1 day after their closure with a crown cork sealing element according to the invention. At interior pressures of between 7 and 10 bar, 88% of the bottles displayed the desired excess pressure valve function. This is within the limits of standard delivery terms.

Figure 4:
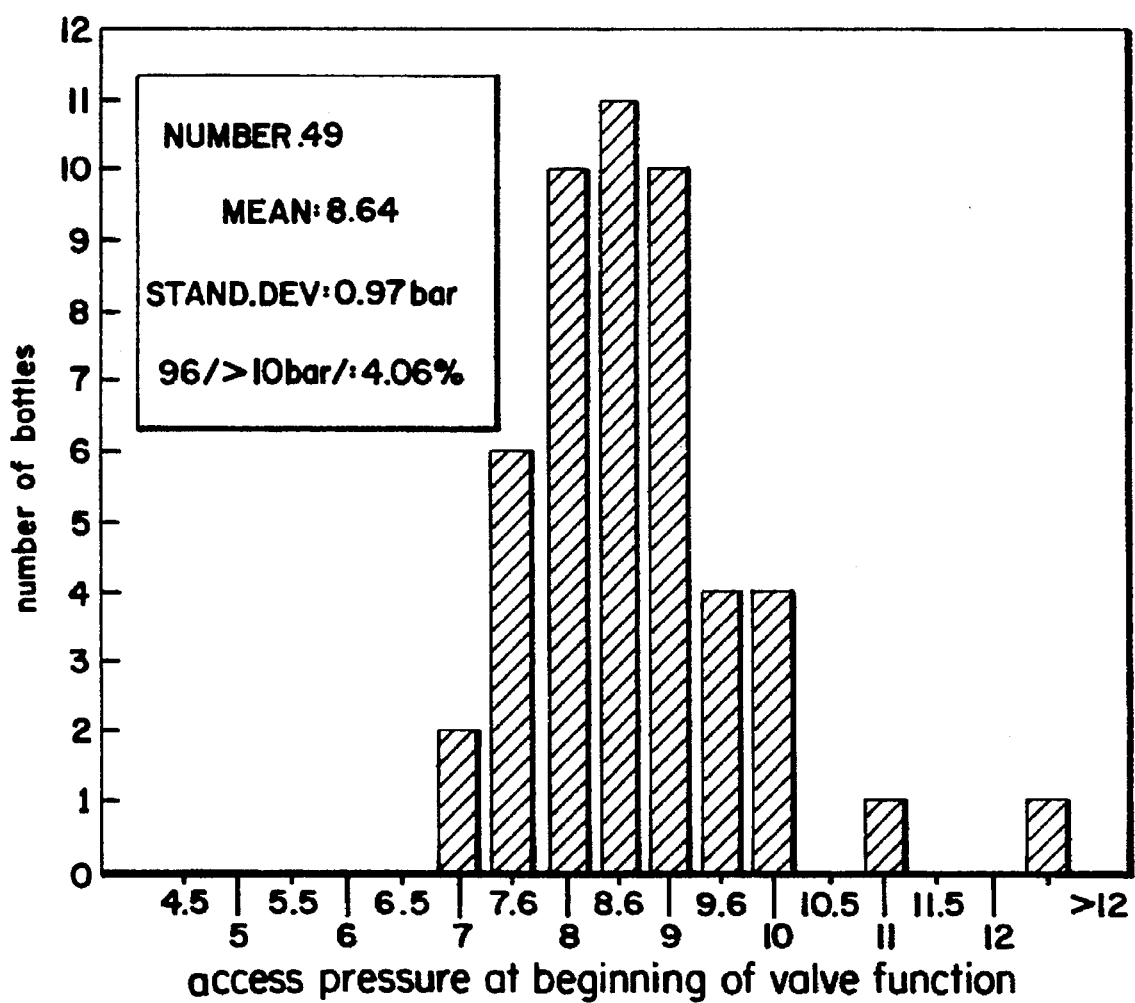

FIG. 4 shows the dependence of pressure tightness on increasing interior pressure, measured according to standard delivery terms, in 49 export beer bottles 3 weeks after closure with a Simmonazzi machine at high speed, using an inventive crown cork liner. 96% of the bottles displayed safety valve function between 7 and 10 bar.

By suitable choice of the constituents added for hardness modification, the polymer compound of the moulding may be designed in such a way that it withstands even the elevated temperature which occurs during bottle pasteurization.

The caps produced according to the invention are ready for use after hardening of the polymer compound and may be stored until their use; the properties of the moulding which forms the inner insert do not change even over lengthy periods.

It goes without saying that, apart from the use described here in conjunction with crown corks and screw caps, other sealing elements for vessel closures can also be produced in which the corresponding moulding is or is not solidly connected or adhered to the closure body.

We claim:

1. A sealing element for bottle closures comprising a composition consisting essentially of:

i) at least about 10 wt-%, based on the total polymer weight in the composition, of a first polymeric component consisting of butyl rubber; and, ii) at least about 15.-%, based on the total polymer weight in the composition, of a second polymeric component consisting of high density polyethylene, the composition consisting essentially of said first and second components being mechanically mouldable and subsequently solidifiable to the desired hardness directly on or in a bottle closure by an in-shell moulding technique to form said sealing element on or in said bottle closure, said sealing element having, in the closed state of the bottle closure, at least one of a) a barrier effect preventing the penetration of gaseous or vaporous substances such as oxygen or aromatic compounds, into the bottle, and b) an excess pressure safety valve effect at interior bottle pressures of between approximately 3 and 10 bar.

2. The sealing element according to claim 1, wherein said composition consists essentially of between 10 wt-% and 60 wt-%, based on the total polymer weight in the composition, of said first component.

3. The sealing element according to claim 2, wherein said composition consists essentially of at least 20 wt-%, based on the total polymer weight in the composition, of said first component.

4. The sealing element according to claim 3, wherein said composition consists essentially of between 30 wt-% and 50 wt-%, based on the total polymer weight in the composition, of said first component.

5. The sealing element according to claim 1, wherein said composition consists essentially of between 10 wt-% and 70 wt-%, based on the total polymer weight in the composition, of said second component.

6. The sealing element according to claim 5, wherein said composition consists essentially of between 30 wt-% and 60 wt-%, based on the total polymer weight in the composition, of said second component.

7. The sealing element according to claim 1, wherein the composition consists essentially of said first and second component at a weight percent ratio of 1:1.

8. The sealing element according to claim 1, wherein the composition further consists essentially of common additives selected from glide enhancers, pigment, talcum, stabilizer, and mixtures thereof.

9. The sealing element according to claim 1, said composition containing 40 to 60 wt-% of butyl rubber, 40 to 60 wt-% of high density polyethylene, up to 0.5 wt-% of glide enhancer, pigment, stabilizer, and up to 5 wt-% of talcum, all weight percent based on the total weight of the composition.

10. The sealing element according to claim 9, said composition containing 42–52 wt-% of butyl rubber and 45–52 wt-% of high density polyethylene, up to 0.5 wt-% of glide enhancer, pigment, stabilizer, and up to 5 wt-% of talcum, all weight percent based on the total weight of the composition.

11. The sealing element according to claim 9, said composition containing 48 wt-% of butyl rubber and 48 wt-% of high density polyethylene, up to 0.5 wt-% of glide enhancer pigment, stabilizer, and up to 5 wt-% of talcum, all weight percent based on the total weight of the composition.

* * * * *

UNITED STATES PATENT AND TRADEMARK OFFICE
CERTIFICATE OF CORRECTION

PATENT NO. : 5,639,525

DATED : June 17, 1997

INVENTOR(S) : Tino Kuhn and Georg Schlenk

It is certified that error appears in the above-identified patent and that said Letters Patent is hereby corrected as shown below:

In column 2, line 56, "C$_2$O)" should read --CO$_2$)--.

In column 4, line 14, "Laid" should read --said--.

In column 5, line 56, "cloture" should read --closure--.

In column 5, line 58, "theme" should read --these--.

In column 6, line 7, insert --(20-- after the letters "kpm".

In column 7, line 46 "49%" should read --4.9%--.

In column 7, line 56, "the" should read --time--.

Signed and Sealed this

Twenty-third Day of December, 1997

Attest:

BRUCE LEHMAN

*Attesting Officer*       *Commissioner of Patents and Trademarks*